J. W. SMITH.
Belt-Lacing Needles.
No. 138,540. Patented May 6, 1873.
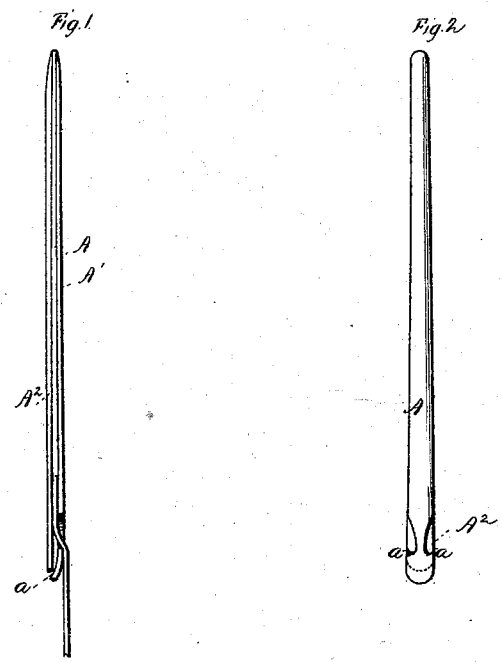

UNITED STATES PATENT OFFICE.

JOHN W. SMITH, OF BRYAN, OHIO.

IMPROVEMENT IN BELT-LACING NEEDLES.

Specification forming part of Letters Patent No. 138,540, dated May 6, 1873; application filed March 15, 1873.

*To all whom it may concern:*

Be it known that I, JOHN W. SMITH, residing in Bryan, in the county of Williams and State of Ohio, have invented a new and useful Improvement in Belt-Lacing Needles, of which the following is a full, clear, and exact description, reference being had to the annexed drawing, in which—

Figure 1 represents a front view of my improved needle, and Fig. 2 a side view thereof.

In the designation of like parts in the two figures corresponding letters of reference are used.

To enable others to make and use my invention, I will proceed to describe it.

Welded to or constructed in one piece with the pointed bar or body A of the needle is a flat thin bar, $A^1$, which, in lieu of having an eye, is notched upon its edges in a manner to provide its head with barbs or a fluke, $a$. From the drawing it will be readily understood how the needle is threaded. Another bar, $A^2$, welded to or constructed in one piece with the body A of the needle, is apposed opposite the bar or tine $A^1$, and a distance therefrom equal to the thickness of the middle or pointed bar A, with its upper end curved or bent toward its fellow, and acting as a spring to retain the strap or lacing within the slot thus formed to receive the free or threaded end thereof. The spring-bar $A^2$ also acts as a shield to the barbs upon its fellow $A^1$, to keep them from being obstructed in their passage through the material by their points catching the latter. By thus disposing the free or threaded end of the strap or lacing, further obstruction to the easy passage of the needle is avoided.

Having thus fully described my invention, what I claim, and desire to secure by Letters Patent, is—

The combination of the bars A $A^1$, spring-bar $A^2$, and barbs $a$, substantially as and for the purpose set forth.

In testimony whereof I have signed the foregoing specification in presence of two subscribing witnesses.

JOHN W. SMITH.

Witnesses:
ROB. MACDONALD,
M. L. BURHAM.